United States Patent
Fukasawa et al.

(10) Patent No.: US 7,253,923 B2
(45) Date of Patent: Aug. 7, 2007

(54) IMAGE PROCESSING APPARATUS

(75) Inventors: Kenji Fukasawa, Nagano-ken (JP); Makoto Fujino, Nagano-ken (JP); Yoshihiro Nakami, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1067 days.

(21) Appl. No.: 10/099,885

(22) Filed: Mar. 14, 2002

(65) Prior Publication Data

US 2002/0181000 A1  Dec. 5, 2002

(30) Foreign Application Priority Data

Mar. 15, 2001  (JP)  .............. 2001-074553

(51) Int. Cl.
- *G03F 3/08* (2006.01)
- *G06F 15/00* (2006.01)
- *H04N 1/46* (2006.01)
- *G06K 9/00* (2006.01)

(52) U.S. Cl. .............. 358/1.9; 358/518; 358/519; 358/534; 358/535; 382/162; 382/167

(58) Field of Classification Search .............. 358/1.9, 358/518–523, 1.1, 534, 535; 382/162, 167; 345/603, 604, 427, 586, 589–591, 150, 152–153, 345/155

See application file for complete search history.

(56) References Cited

U.S. PATENT DOCUMENTS 6,011,547 A   1/2000  Shiota et al.
6,215,561 B1 * 4/2001  Kakutani ............... 358/1.9
6,273,535 B1   8/2001  Inoue et al.
6,748,107 B1 * 6/2004  Fushiki et al. .......... 382/162
6,758,574 B1 * 7/2004  Roberts .................. 362/162

FOREIGN PATENT DOCUMENTS

| JP | 06-008537 | 1/1994 |
| JP | 09-219817 | 8/1997 |
| JP | 10-191246 | 7/1998 |
| JP | 10-226139 | 8/1998 |
| JP | 11-041622 | 2/1999 |

(Continued)

OTHER PUBLICATIONS

Abstract of Japanese Patent Pub. No. 06-008537, Pub. Date: Jan. 18, 1994, Patent Abstracts of Japan.

(Continued)

*Primary Examiner*—Kimberly Williams
*Assistant Examiner*—Charlotte M. Baker
(74) *Attorney, Agent, or Firm*—Martine Penilla & Gencarella, LLP

(57) ABSTRACT

CPU 150 performs a matrix operation on image data GD, and then increases the effective digit place number of the color values of the image data GD to increase the tone number of the image data GD from 8-bit tone to 18-bit tone. CPU 150 performs a gamma correction process, a matrix operation $N^{-1}M$, and an inverse gamma correction process, and then restores the tone number of the image data GD to the original 8-bit tone, and performs automatic quality adjustment. As a result, the 8-bit tone of the original image data GD is preserved throughout image processing, and reproductive color number of the image data GD is preserved as well.

28 Claims, 12 Drawing Sheets

FOREIGN PATENT DOCUMENTS

| | | |
|---|---|---|
| JP | 11-069141 | 3/1999 |
| JP | 11-088672 | 3/1999 |
| JP | 11-127415 | 5/1999 |
| JP | 11-327605 | 11/1999 |
| JP | 11-331596 | 11/1999 |
| JP | 2000-013718 | 1/2000 |
| JP | 2000-137806 | 5/2000 |
| JP | 2000-278598 | 10/2000 |
| JP | 2001-147481 | 5/2001 |

OTHER PUBLICATIONS

Abstract of Japanese Patent Pub. No. 09-219817, Pub. Date: Aug. 19, 1997, Patent Abstracts of Japan.
Abstract of Japanese Patent Pub. No. 10-191246, Pub. Date: Jul. 21, 1998, Patent Abstracts of Japan.
Abstract of Japanese Patent Pub. No. 10-226139, Pub. Date: Aug. 25, 1998, Patent Abstracts of Japan.
Abstract of Japanese Patent Pub. No. 11-088672, Pub. Date: Mar. 3, 1999, Patent Abstracts of Japan.
Abstract of Japanese Patent Pub. No. 11-127415, Pub. Date: May 11, 1999, Patent Abstracts of Japan.
Abstract of Japanese Patent Pub. No. 11-331596, Pub. Date: Nov. 30, 1999, Patent Abstracts of Japan.
Abstract of Japanese Patent Pub. No. 2000-013718, Pub. Date: Jan. 14, 2000, Patent Abstracts of Japan.
Abstract of Japanese Patent Pub. No. 2000-137806, Pub. Date: May 16, 2000, Patent Abstracts of Japan.
Abstract of Japanese Patent Pub. No. 2001-147481, Pub. Date: May 29, 2001, Patent Abstracts of Japan.
Abstract of Japanese Patent Publication 11-041622, Pub. Date: Feb. 12, 1999, Patent Abstracts of Japan.
Abstract of Japanese Patent Publication 11-327605, Pub. Date: Nov. 26, 1999, Patent Abstracts of Japan.
Abstract of Japanese Patent Publication 2000-278598, Pub. Date: Oct. 6, 2000, Patent Abstracts of Japan.
Abstract of Japanese Patent Publication No. 11-069141, Pub. Date: Mar. 9, 1999, Patent Abstracts of Japan.

* cited by examiner

IMAGE PROCESSING APPARATUS

FIELD OF THE INVENTION

The present invention relates to an image processing apparatus and image processing program for performing image processing of image files.

BACKGROUND OF THE INVENTION

Currently, image data based on various different color spaces is used in image data processing apparatuses such as computers, printers and digital still cameras. For example, in computers, image data based on the RGB color space, which presumes output to a monitor, is normally used, and in digital still cameras (DSCs), since created image data is compressed and stored in JPEG format, image data based on the YCbCr color space adapted to compression is used. Therefore, when image data created by a DSC is processed by a computer, for example, the color space of the image data needed to be converted from the YCbCr color space to the RGB color space.

However, when the color space of image data is converted from a first color space (YCbCr) to a second color space (RGB), color values arrayed at equal intervals in the first color space are not always equal intervals in the second color space, so there is the problem that tone number (reproductive color number) of converted image data is reduced compared to tone number (reproductive color number) of image data before conversion. When tone number is reduced, the number of colors that can be reproduced is reduced, so the colors of the image data cannot be reproduced correctly, creating the problem that only output images with skipped tones can be obtained.

SUMMARY OF THE INVENTION

The present invention was made in order to solve the above-mentioned problems, and has as an object to preserve tone number and reproductive color number of image data from before to after image processing conversion.

To solve the above-mentioned problems a first aspect of the present invention provides an image processing apparatus for performing image processing of image data. The image processing apparatus pertaining to the first aspect of the present invention is characterized by comprising color converting means for converting by means of a matrix operation image data of a first color system in a first color coordinate system, said color system capable of representing a first color number, to image data of a second color system in a second color coordinate system, said color system capable of representing a second color number more numerous than the first color number, while preserving the first color number, image processing means for performing image processing on the converted image data in the second color system, and reproductive color number reducing means for reducing the reproductive color number of image data subjected to the image processing.

According to the image processing apparatus pertaining to the first aspect of the present invention, image data of a first color system capable of representing a first color number in a first color coordinate system can be converted by means of a matrix operation to image data of a second color system capable of representing a second color number more numerous than the first color number in a second color coordinate system while preserving the a first color number, so even when a color conversion process is performed in different color coordinate systems, tone number and reproductive color number of image data can be preserved from before to after color conversion processing (image processing).

In the image processing apparatus pertaining to the first aspect of the present invention, image processing performed by the image processing means may include gamma correction processing, and may include color conversion processing using a second matrix operation.

In the image processing apparatus pertaining to the first aspect of the present invention, the first color system may be the YCC color system, and the second color system may be the sRGB color system, or the first color system may be the YCC color system, and the second color system may be the wRGB color system which has a wider color representation range than the sRGB color system. In either case, the a first color number are preserved after color conversion, and particularly where the wRGB color system is used, negative color values that cannot be rendered in the sRGB color system can also be rendered.

In the image processing apparatus pertaining to the first aspect of the present invention, the second color number of the second color system can include a color number represented by a negative value included in image data converted by the color converting means from the first color system to the second color system. In this case, even if a negative value is included in image data converted from the first color system to the second color system, rendering can be done without dropout of the color value represented by the negative value.

A second aspect of the present invention provides an image processing apparatus for performing image processing on image data. The image processing apparatus pertaining to the first aspect of the present invention comprises first image processing means for modifying a color value of the image data represented by an integral value having first effective digits into a first value having a greater place number than the place number of the first effective digits, tone number reduction preventing means for preventing reduction of tone number of the image data accompanying modification of color value by the first image processing means, and second image processing means for modifying the color value of image data having the first value from the first value to a second value reflected in image output results.

According to the image processing apparatus pertaining to the second aspect of the present invention, reduction of tone number of image data accompanying conversion of a color value to a first value is prevented, and image data having a first value is converted from the first value to a second value reflected in image output results, so tone number and reproductive color number of image data can be preserved from before to after image processing.

In the image processing apparatus pertaining to the second aspect of the present invention, the tone number reduction preventing means may prevent reduction of tone number of the image data by means of setting the effective digits of the first value to a greater place number than the place number of the first effective digits. In this case, even if integers having a plurality of different first effective digits assume identical first values, since the place number of effective digits increases, the original tone number can be preserved. The data size of image data prevented by the tone number reduction preventing means from tone number reduction may be larger than the data size of image data represented by integers having the first effective digits. Since the place number of effective digits increases, data size of image data increases.

In the image processing apparatus pertaining to the second aspect of the present invention, the first image processing means may be color space converting means for converting the color space of the image data from a first color space to a second color space. The color space converting means may convert the color space of the image data from the YCbCr color space to the RGB color space, and convert a color value of the image data represented by integers having the first effective digits to an first value that includes a decimal point. By increasing the place number of effective digits, even if first values include a decimal point, tone number can be preserved.

A third aspect of the present invention provides an image processing apparatus for performing image processing on image data. The image processing apparatus pertaining to the third aspect of the present invention comprises first color space converting means for increasing the tone number of the image data from a first tone number to a second tone number, as well as converting the color space of image data from the YCbCr color space to the sRGB color space, gamma correcting means for performing gamma correction on the color space-converted image data, second color space converting means for converting the color space of the gamma-corrected image data from the sRGB color space to a wRGB color space having a wider defined range than the sRGB color space, and tone number reducing means for restoring tone number of the color space-converted image data from the second tone number to the first tone number.

According to the image processing apparatus pertaining to the third aspect of the present invention, the color space of image data is converted from the sRGB color space to the wRGB color space while increasing the tone number of the image data from a first tone number to a second tone number, so tone number and reproductive color number of image data can be preserved from before to after image processing conversion.

The image processing apparatus pertaining to the third aspect of the present invention may further comprise inverse gamma correcting means for performing inverse gamma correction on the color space-converted image data, and the tone number reducing means may restore the tone number of the inverse gamma-corrected image data, rather than the color space-converted image data, from the second tone number to the first tone number. In this case tone accuracy in the inverse gamma correction process can be preserved or improved.

The image processing apparatus pertaining to the third aspect of the present invention may further comprise image correcting means for automatically correcting quality of the inverse gamma corrected-image data, and the tone number reducing means may restore the tone number of the quality-corrected image data, rather than the inverse gamma-corrected image data, from the second tone number to the first tone number. In this case tone accuracy in the image correction process can be preserved or improved.

A fourth aspect of the present invention provides an output apparatus for outputting image-processed image data. The printing apparatus pertaining to the fourth aspect of the present invention comprises the image processing apparatus according to any of the first to third aspects of the present invention, and output means for outputting image data subjected to image processing by the image processing apparatus.

According to the output apparatus pertaining to the fourth aspect of the present invention, image data with good tone can be output.

A fifth aspect of the present invention provides a computer-readable medium having recorded thereon an image processing program for performing image processing on image data. The image processing program recorded on a computer-readable medium pertaining to the fifth aspect of the present invention is characterized in that a function for converting by means of a matrix operation image data of a first color system in a first color coordinate system, said color system capable of representing a first color number, to image data of a second color system in a second color coordinate system, said color system capable of representing a second color number more numerous than the a first color number, while preserving the first color number, a function for performing image processing on the converted image data in the second color system, and a function for reducing the reproductive color number of image data subjected to the image processing are realized by means of a computer.

According to the computer-readable medium having recorded thereon an image processing program pertaining to the fifth aspect of the present invention, there are obtained working effects similar to those of the image processing apparatus pertaining to the first aspect of the present invention. The computer-readable medium having recorded thereon an image processing program pertaining to the fifth aspect of the present invention, like the image processing apparatus pertaining to the first aspect of the present invention, may be realized in various aspects.

A sixth aspect of the present invention provides a computer-readable medium having recorded thereon an image processing program for performing image processing on image data. The image processing program recorded on a computer-readable medium pertaining to the sixth aspect of the present invention is characterized in that a first image processing function for converting a color value of the image data represented by an integral value having first effective digits into a first value having a greater place number than the place number of the first effective digits, a function for preventing reduction of tone number of the image data accompanying modification of color value by the first image processing means, and a second image processing function for modifying a color value of image data having the first value from the first value to a second value that is reflected in image output results are realized by means of a computer.

According to the computer-readable medium having recorded thereon an image processing program pertaining to the sixth aspect of the present invention, there are obtained working effects similar to those of the image processing apparatus pertaining to the second aspect of the present invention. The computer-readable medium having recorded thereon an image processing program pertaining to the sixth aspect of the present invention, like the image processing apparatus pertaining to the second aspect of the present invention, may be realized in various aspects.

A seventh aspect of the present invention provides a computer-readable medium having recorded thereon an image processing program for performing image processing on image data. The image processing program recorded on a computer-readable medium pertaining to the seventh aspect of the present invention is characterized in that a first color space converting function for increasing the tone number of the image data from a first tone number to a second tone number, as well as converting the color space of image data from the YCbCr color space to the sRGB color space, a gamma correcting function for performing gamma correction on the color space-converted image data, a second color space converting function for converting the color space of the gamma-corrected image data from the sRGB color space to a wRGB color space having a wider defined range than the sRGB color space, and a tone number reducing function for restoring the tone number of the color space-converted image data from the second tone number to the first tone number.

According to the computer-readable medium having recorded thereon an image processing program pertaining to the seventh aspect of the present invention, there are obtained working effects similar to those of the image processing apparatus pertaining to the third aspect of the present invention. The computer-readable medium having recorded thereon an image processing program pertaining to the seventh aspect of the present invention, like the image processing apparatus pertaining to the third aspect of the present invention, may be realized in various aspects.

DETAILED DESCRIPTION OF THE PREFERRED EMBODIMENTS

Figure 1:
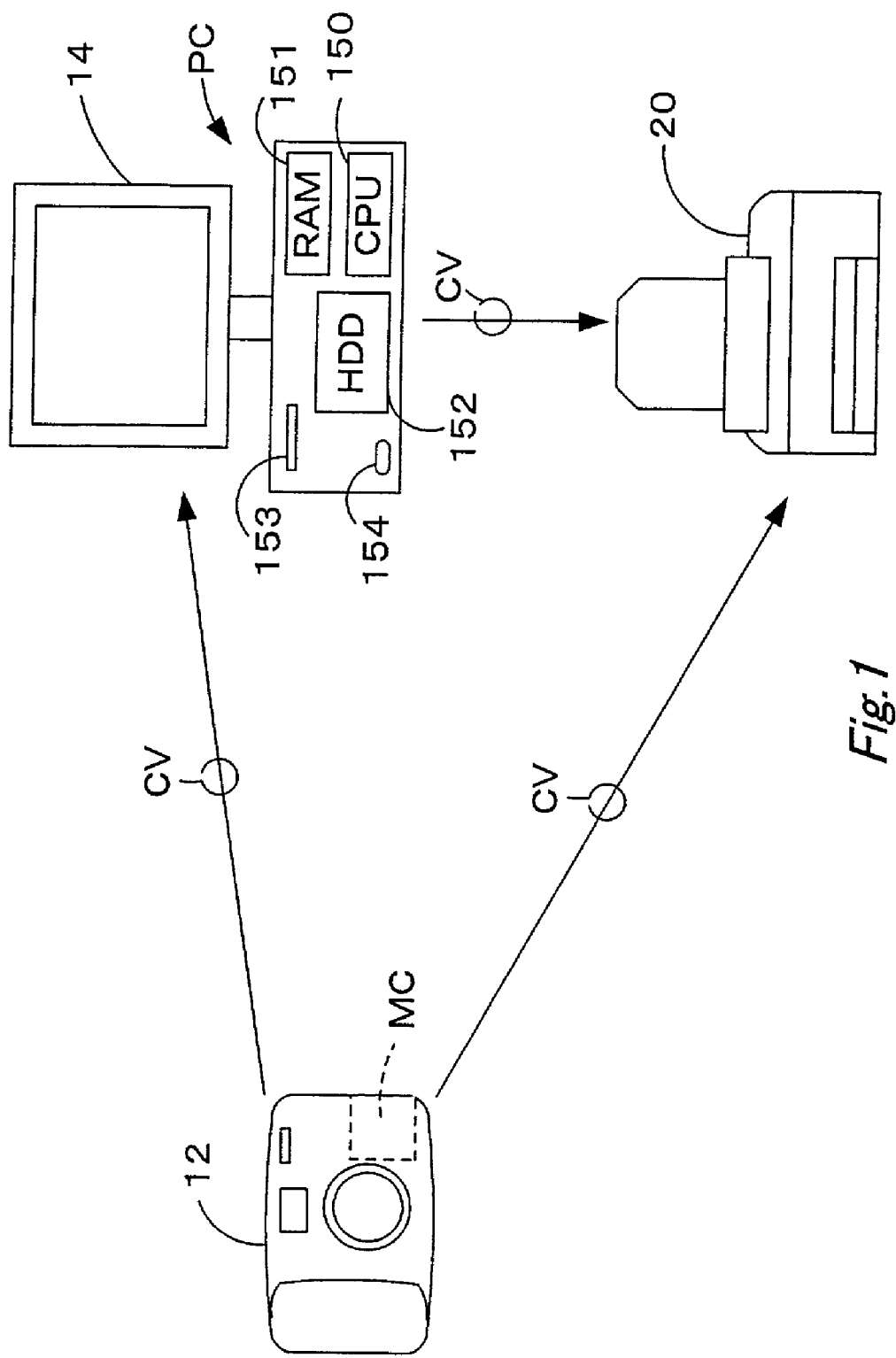
FIG. 1 is an illustrative diagram showing an exemplary image processing system permitting implementation of the image processing apparatus in accordance with this embodiment.
Figure 2:
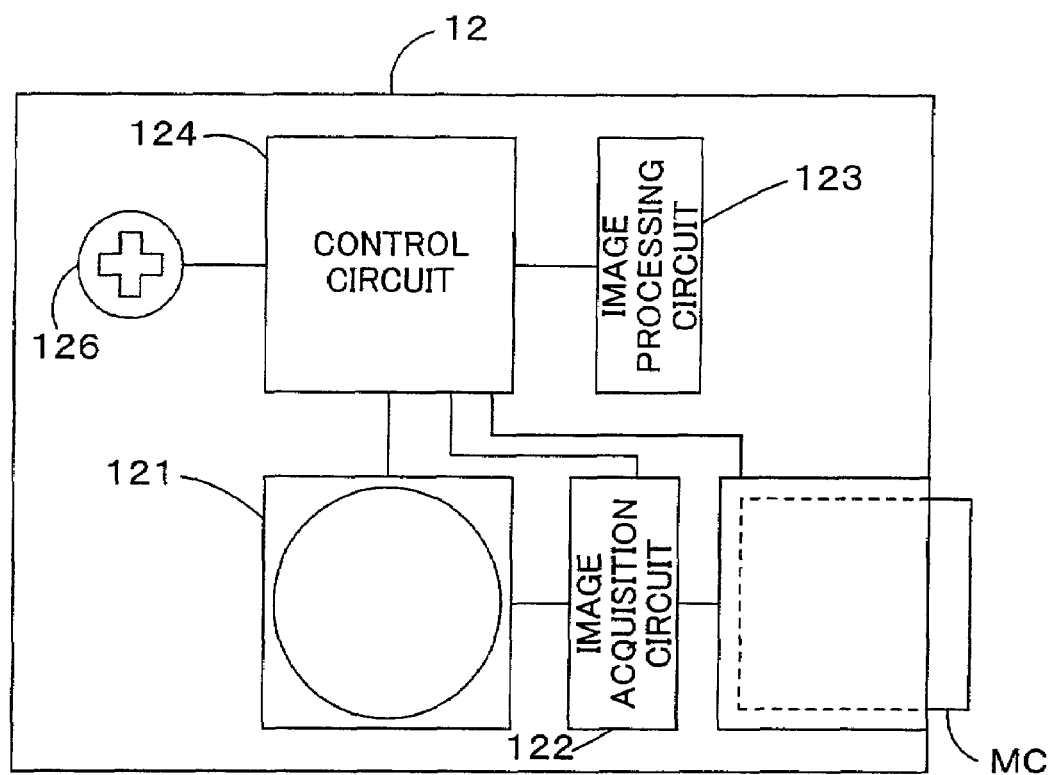
FIG. 2 is a block diagram showing a simplified arrangement of a digital still camera capable of generating an image file (image data) for processing by the image processing apparatus in accordance with this embodiment.
Figure 3:
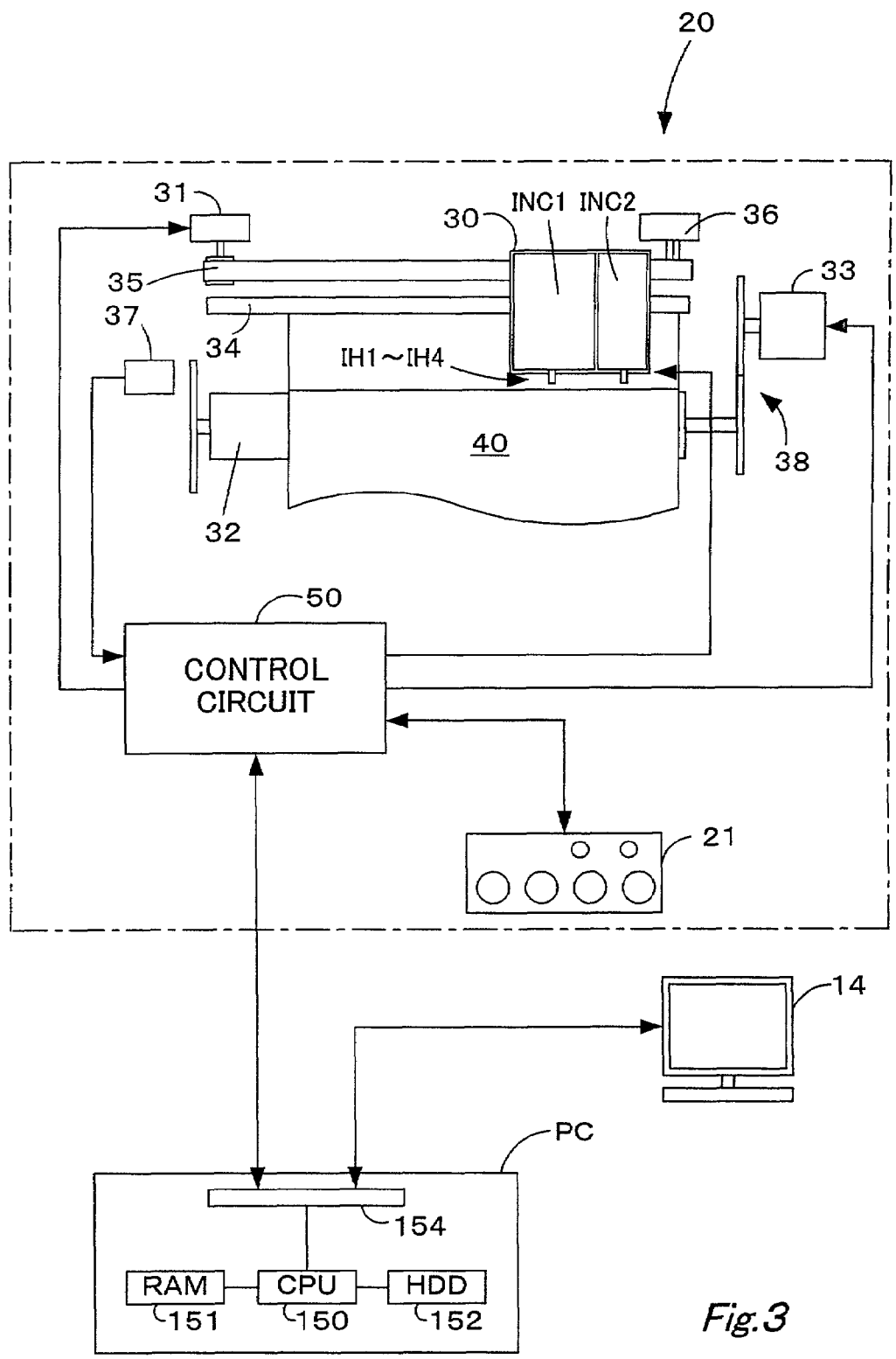
FIG. 3 is an illustrative diagram showing conceptually an internal structure for an image file stored in Exif file format, useable in this embodiment.
Figure 4:
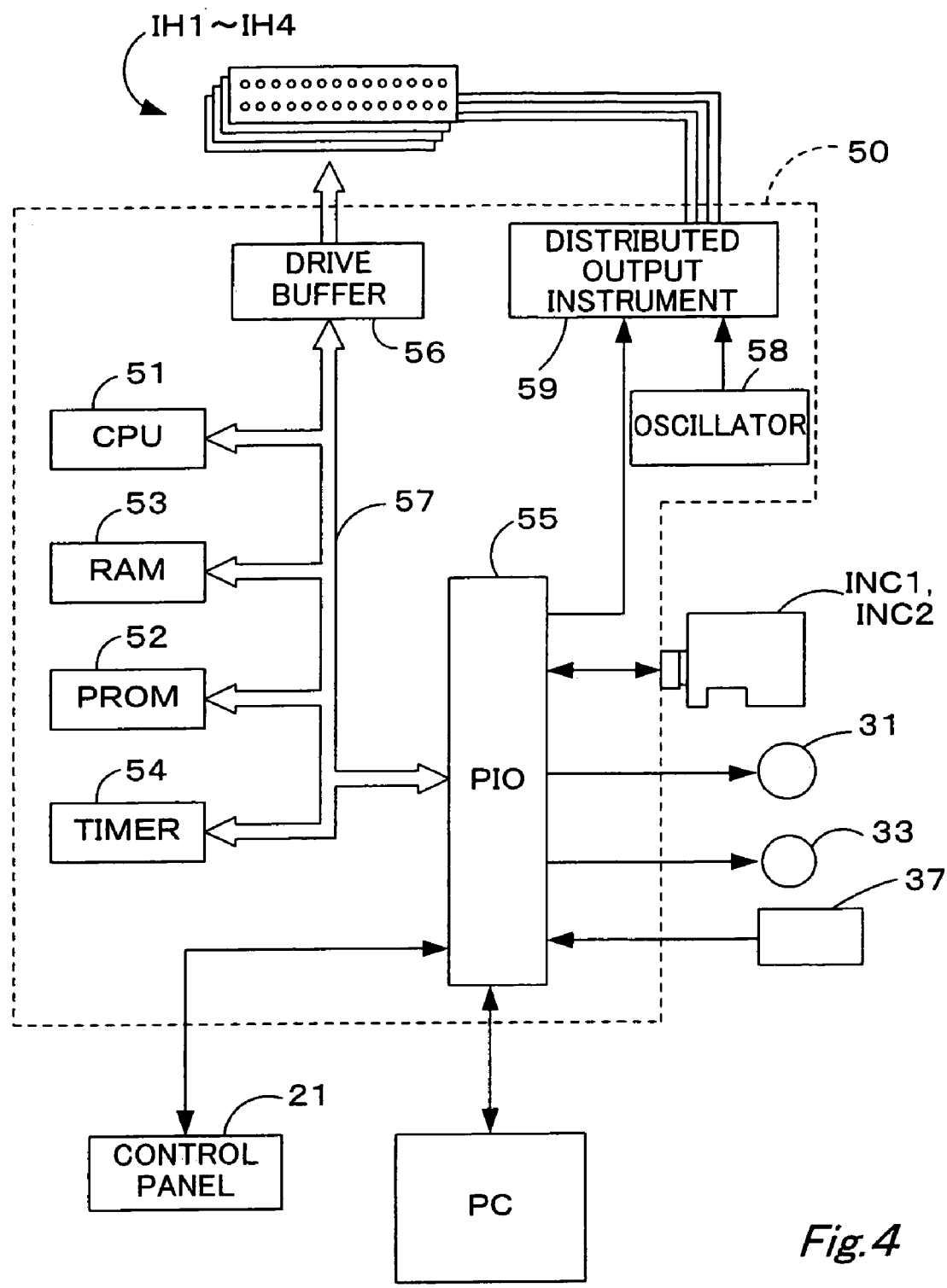
FIG. 4 is a block diagram showing the general arrangement of color printer 20 in accordance with this embodiment.

The image processing apparatus pertaining to the present invention is described hereinbelow based on some examples in the order hereinbelow while referring to the drawings.
A. Arrangement of image processing system
B. Structure of image file
C. Image processing in image processing apparatus
D. Other Embodiments A. Arrangement of Image Processing System The arrangement of an image data processing system permitting implementation of the image processing apparatus pertaining to this example is described with reference to FIGS. 1 to 4. FIG. 1 is an illustrative diagram showing an exemplary image processing system permitting implementation of the image processing apparatus in accordance with this embodiment. FIG. 2 is a block diagram showing a simplified arrangement of a digital still camera capable of generating an image file (image data) for output by the image processing apparatus in accordance with this embodiment. FIG. 3 is a conceptual diagram of internal structure of a color printer useable in this example. FIG. 4 is a block diagram showing the internal arrangement of control circuit of a color printer 20 in accordance with this embodiment.

Image processing system 10 comprises a digital still camera 12 as an input device for generating an image file; a personal computer PC as an image processing apparatus for performing image processing on the basis of an image file generated by digital still camera 12, and outputting image data for printing; and a color printer 20 as an output device for outputting image data for printing. As the image processing apparatus there could be used, instead of a personal computer PC, a standalone type printer, for example. As output apparatuses there may also be used, besides printer 20, a CRT display, LCD display, or other such monitor 14, a projector, or the like. In the description hereinbelow it shall be assumed that a color printer 20 connected to a personal computer PC is used as the output apparatus.

Personal computer PC is a computer of a type commonly used, and comprises a CPU 150 for executing the image processing program pertaining to the present invention, RAM 151 for temporarily storing results of operations in CPU 150, image data, and the like, and a hard disk drive (HDD) 152 for storing the image processing program. Personal computer PC comprises a card slot 153 for insertion of a memory card MC or the like, and an input terminal 154 for connection of a connector cable from a digital still camera 12.

Digital still camera 12 is a camera that acquires an image by means of imaging light information with a digital device (e.g. a CCD or photomultiplier); as shown in FIG. 2 it comprises an optical circuit 121 equipped with a CCD, etc. for gathering light information, an image acquisition circuit 122 for controlling optical circuit 121 to acquire an image, an image processing circuit 123 for processing the acquired digital image; and a control circuit 124 for controlling the various circuits, and equipped with memory. Digital still camera 12 stores the acquired image as digital data in a memory card MC as the storage apparatus. As the format for storing image data in digital still camera 12, the JPEG format is typical, but other storage formats can be used such as TIFF format, GIF format, BMP format, RAW format or the like.

Digital still camera 12 also comprises a Select/Set button 126 for setting brightness, contrast, exposure compensation (exposure compensation value), white balance, and other individual image processing control parameters, and picture modes having preset a plurality of image processing control parameter values for photographic conditions, and a liquid crystal display 127 for previewing photographed images, and setting the picture mode etc., using the Select/Set button 126.

The digital still camera 12 used in this image processing system 10 stores as image file GF in a memory card MC image data GD plus image processing control information GC for image data. That is, image processing control information GC is automatically stored in memory card MC as information automatically making up image file GF together with image data GD at the time of shooting.

Image file GF generated by digital still camera 12 is, for example, sent to color printer 20 via a cable CV [and] a computer PC, or via cable CV. Or, the memory card MC on which the image file GF is stored in digital still camera 12 is connected, directly to color printer 20 or via a computer PC equipped with a memory card slot, in order to send the image file to color printer 20. In the description hereinbelow, the description is based on the case of the memory card MC being connected, directly to a personal computer PC.

The internal arrangement of the image output apparatus used in this example, that is, a color printer 20, is described with reference to FIG. 3. Color printer 20 is a printer capable of color image output and is a printer of ink-jet type that forms an image by ejecting colored inks of the four colors of, for example, cyan (C), magenta (M), yellow (Y) and black (K), onto a print medium to produce a dot pattern. Or, it is a printer of electrophotographic type that transfer/fixes color toner onto a print medium to produce an image. For the colored inks, besides the four colors, light cyan (LC), light magenta (LM), or dark yellow (DY) colored inks may also be used.

As shown in the drawing, color printer 20 comprises a mechanism for driving print heads IH1-IH4 conveyed on a carriage 30 to perform ink ejection and dot formation, a mechanism for causing reciprocating motion of this carriage 30 in the axial direction of a platen 32 by means of a carriage motor 31, a mechanism for advancing cut paper 40 for printing by means of a paper feed motor 33, and a control circuit 50. The mechanism for causing reciprocal motion of carriage 30 in the axial direction of platen 32 comprises a slide rail 34 extending parallel to the axis of platen 32 for slidably retaining cartridge 30, a pulley 36 having an endless drive belt 35 extending between it and carriage motor 31, and the like.

Control circuit 50, while exchanging signals with the control panel 21 of the printer, appropriately controls operation of paper feed motor 33, carriage motor 31, and print heads IH1-IH4. An ink cartridge INC1 and an ink cartridge INC2 are installed on carriage 30. Ink cartridge INC1 contains black (K) ink, while ink cartridge INC2 contains other inks, specifically, inks of the three colors of cyan (C), magenta (M), and yellow (Y). As noted previously, light cyan (LC), light magenta (LM), and dark yellow (DY) inks may be contained as well.

The internal arrangement of control circuit 50 of color printer 20 is described with reference to FIG. 4. As shown in the drawing, control circuit 50 comprises a CPU 51; PROM 52; RAM 53; a peripheral I/O portion (PIO) 55, a timer 54, a drive buffer 56 and the like. PIO 55 is connected to a personal computer PC, carriage motor 31, paper feed motor 33 and an encoder 37. Drive buffer 56 is used as a buffer for supplying dot ON/OFF signals to print heads IH1 to IH4. These are interconnected by means of a bus 57 to enable exchange of data among them. Control circuit 50 additionally comprises an oscillator 58 for outputting a drive waveform of predetermined frequency, and a distributed output instrument 59 for distributing output from oscillator 58 to print heads IH1 to IH4 at predetermined timing. Control circuit 50 outputs dot data to drive buffer 56 at predetermined timing while synchronizing with operation of paper feed motor 33 and carriage motor 31.

B. Structure of Image File

Figure 5:
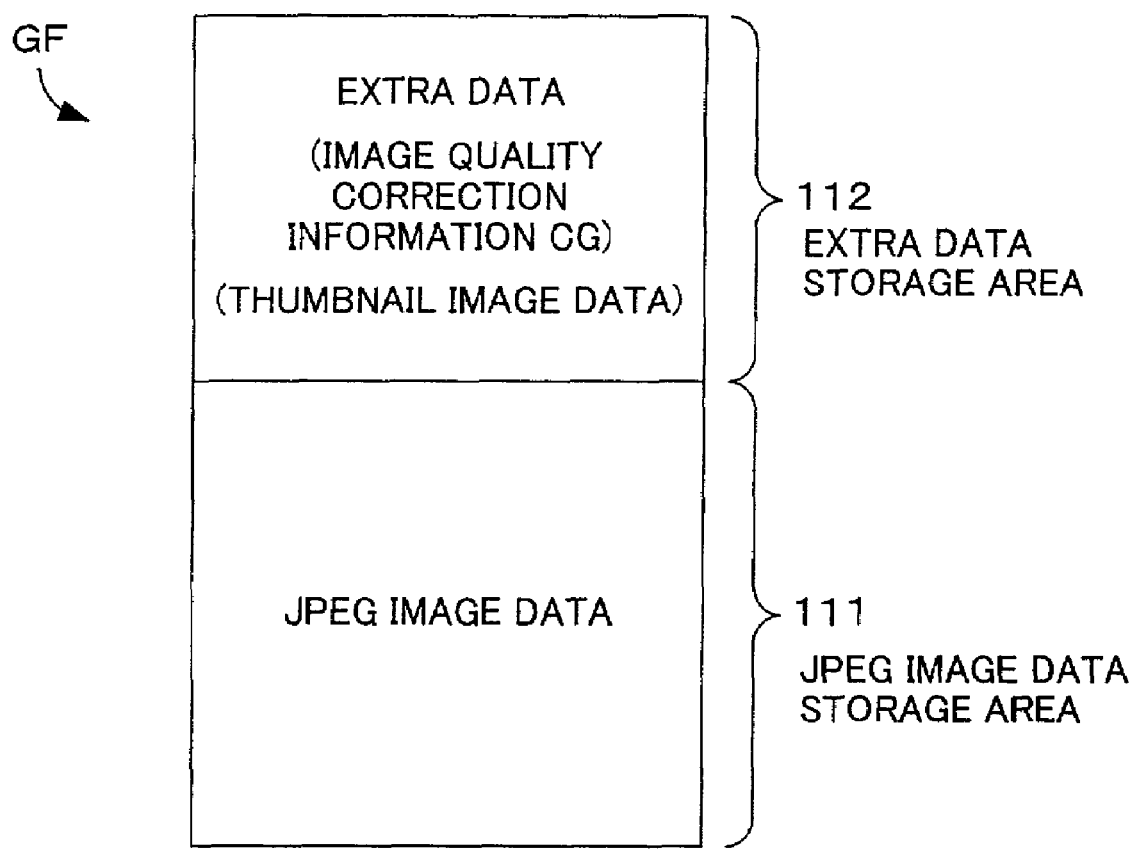
FIG. 5 is an illustrative diagram showing the internal arrangement of control circuit 30 of color printer 20 in accordance with this embodiment.

The general arrangement of an image file useable in this example is explained with reference to FIG. 5. FIG. 5 is an illustrative diagram showing conceptually an example of an internal arrangement for an image file useable in this example. The image file GF pertaining to this example may have, for example, a file structure according to the digital still camera image file format standard (Exif). Exif file specifications are laid down by the Japan Electronics and Information Technologies Industries Association (JEITA).

Image file GF as an Exif file comprises a JPEG image data storage area 111 for storing image data in JPEG format, and an extra information storage area 112 for storing information of various kinds relating to stored JPEG image data. Extra information storage area 112 contains image processing control information GC, namely date & time stamp, exposure, shutter speed, white balance, exposure compensation, target color space, etc., for reference when outputting a JPEG image. The extra information storage area 112 also contains, in addition to image processing control information GC, thumbnail image data stored in TIFF format for JPEG images stored in JPEG image data storage area 111. It is common knowledge to practitioners of the art that with files of Exif format, tags are used to identify data of various kinds, and on occasion data is referred to by its tag name. The terms file structure, data structure and storage area in this example mean a file or data image in a state wherein a file or data etc. is stored in a storage apparatus.

Image processing control information GC is information relating to picture quality at the time of generating image data (time of shooting) in a digital still camera 12 or other such image data generating apparatus, and can include parameters that can be set automatically at shooting, or arbitrarily by the user, such as exposure time, ISO sensitivity, aperture, shutter speed, and focal distance; and image processing control parameters arbitrarily set by the user such as exposure compensation, white balance, picture mode, target color space and the like.

The aforementioned image file GF pertaining to this example can be generated by a digital still camera 12, or by a digital video camera, scanner or other such input apparatus (image file generating apparatus).

C. Image Processing in Image Processing Apparatus

Figure 6:
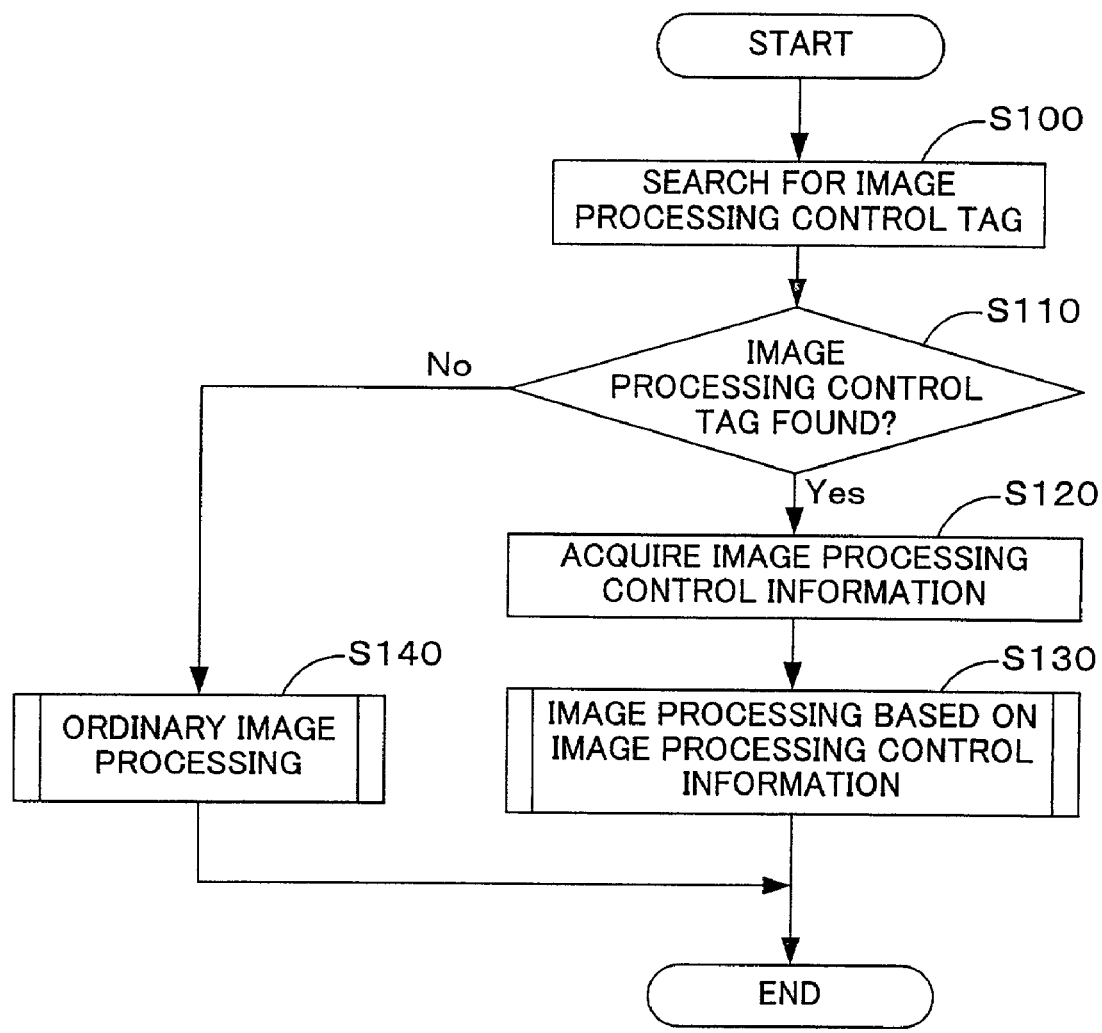
FIG. 6 is a flow chart showing a processing routine for image processing performed in a personal computer PC pertaining in accordance with this embodiment.
Figure 7:
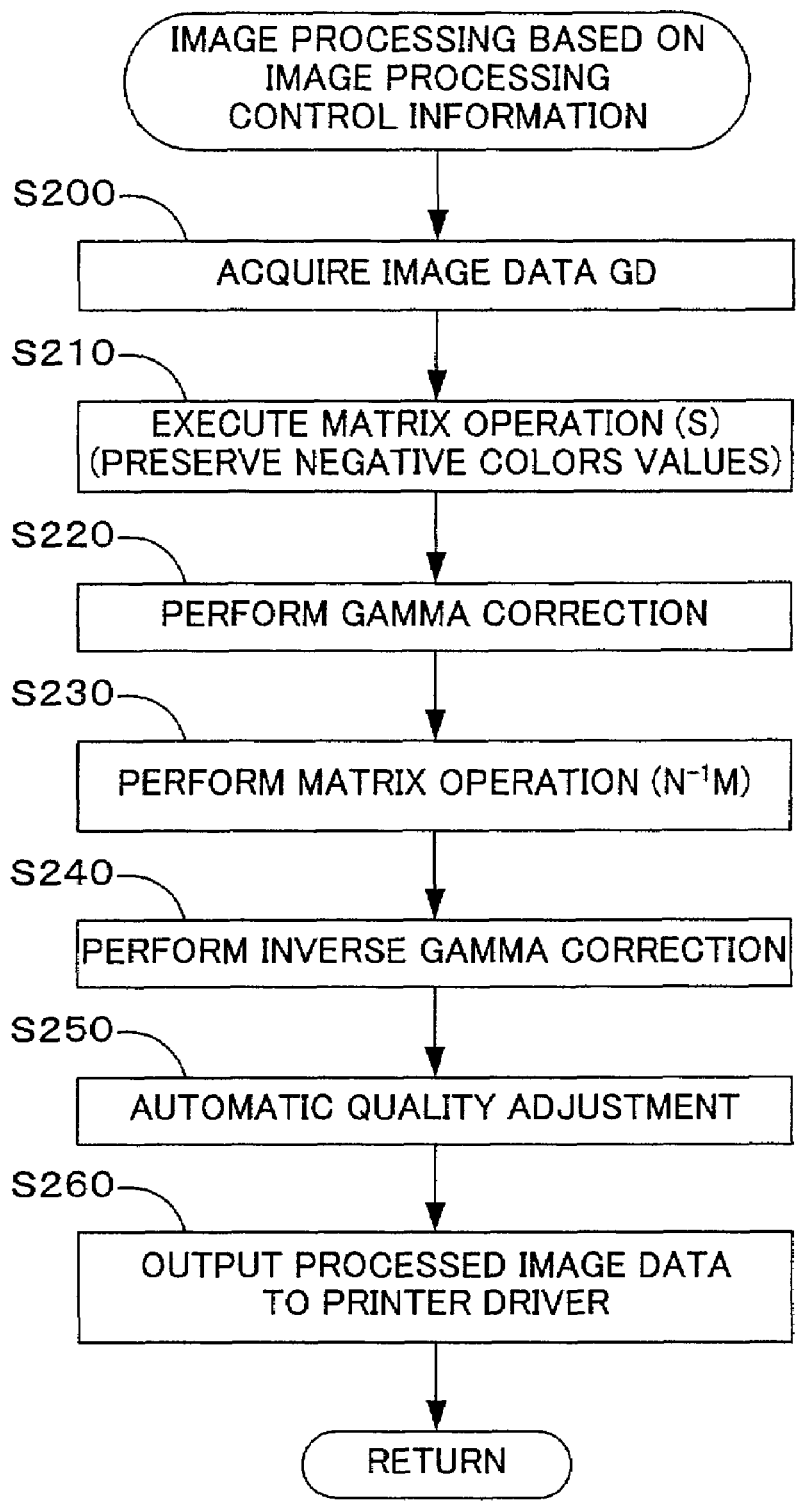
FIG. 7 is a flow chart showing a processing routine for image processing performed in a personal computer PC, based on image processing control information GC.
Figure 8:
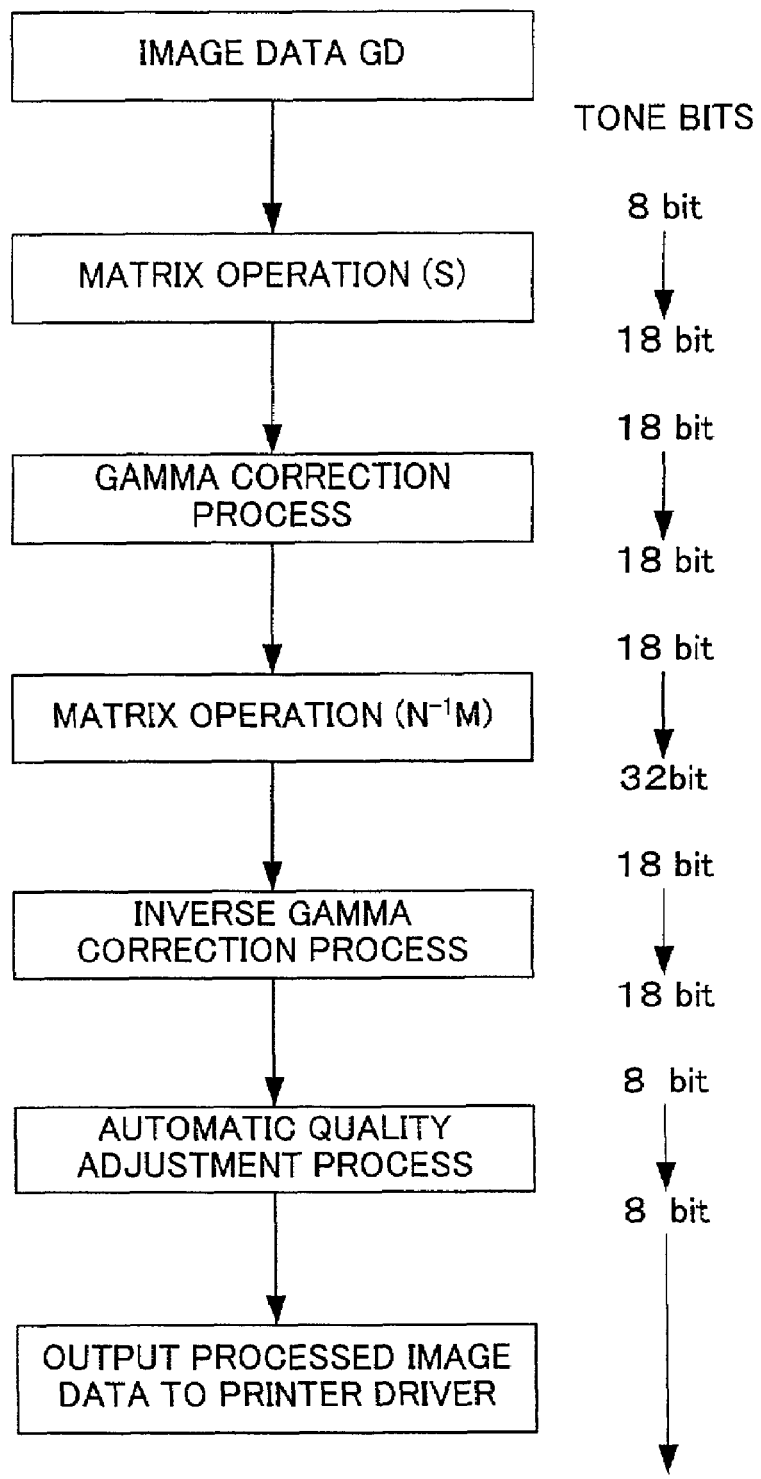
FIG. 8 is an illustrative diagram showing the relationship of image processing and tone number according to this embodiment.
Figure 9:
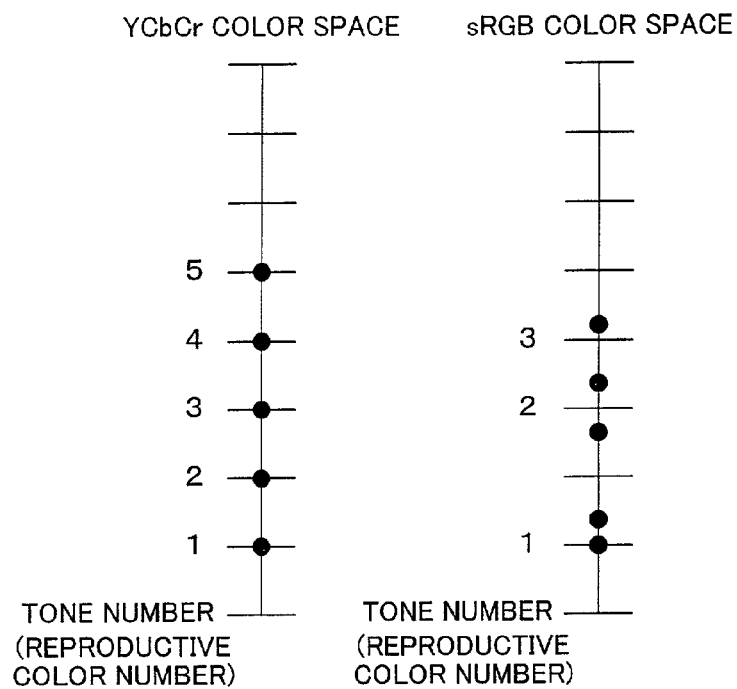
FIG. 9 is an illustrative diagram showing conceptually the condition of reducing tone number by means of executing color space conversion.
Figure 10:
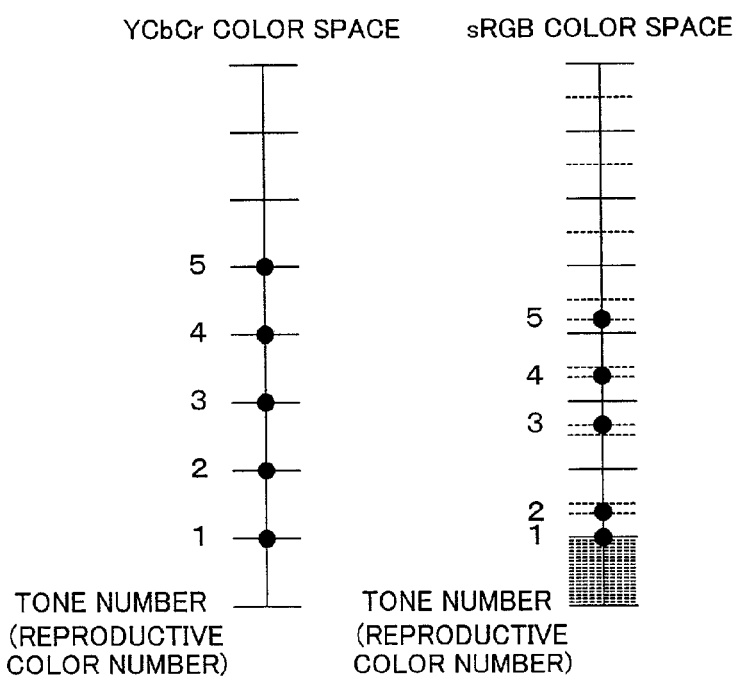
FIG. 10 is an illustrative diagram showing conceptually the condition of being able to preserve tone number even by means of executing color space conversion due to the working effect of this embodiment.
Figure 11:
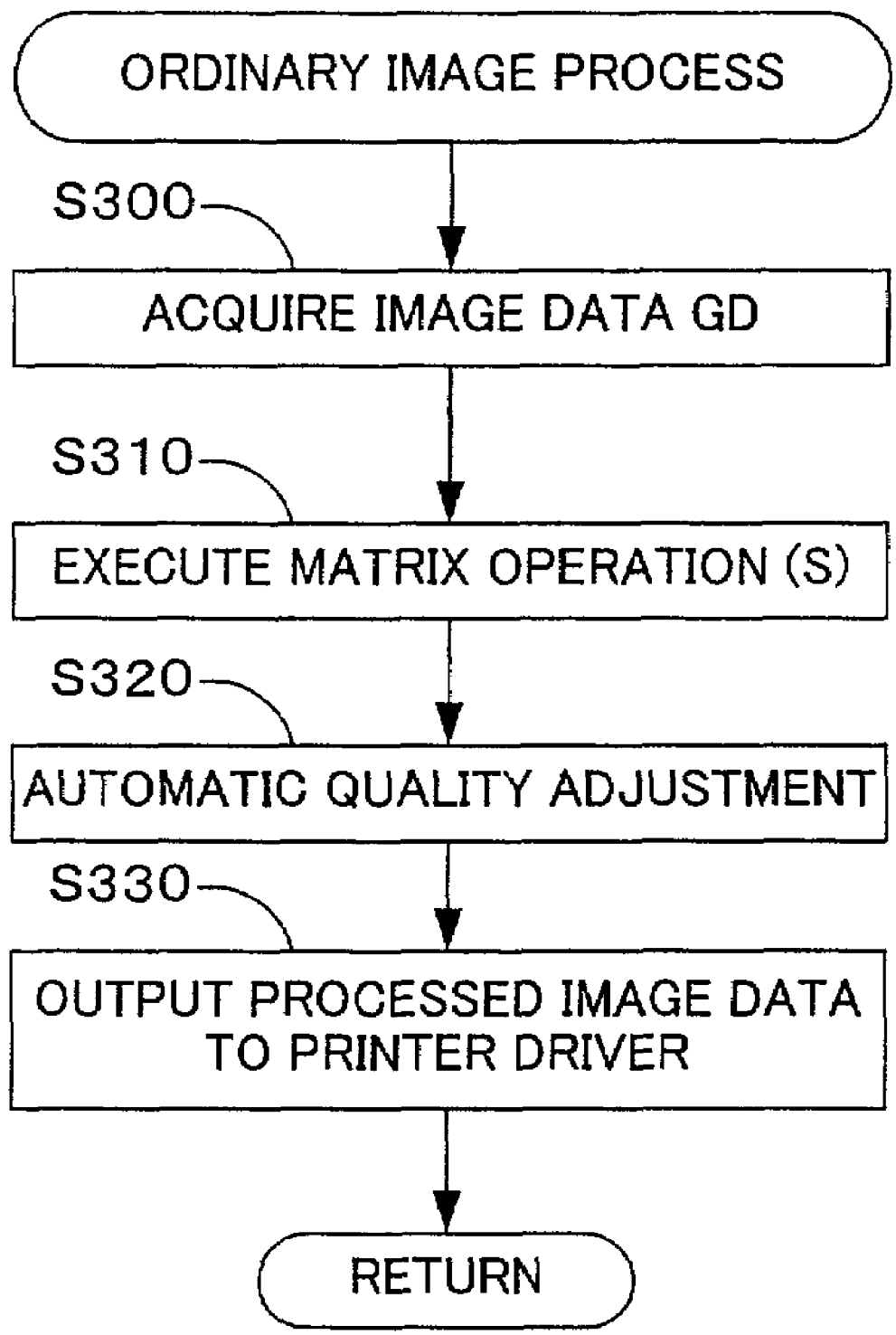
FIG. 11 is a flow chart showing a processing routine for image processing for normal image processing performed in a personal computer PC.
Figure 12:
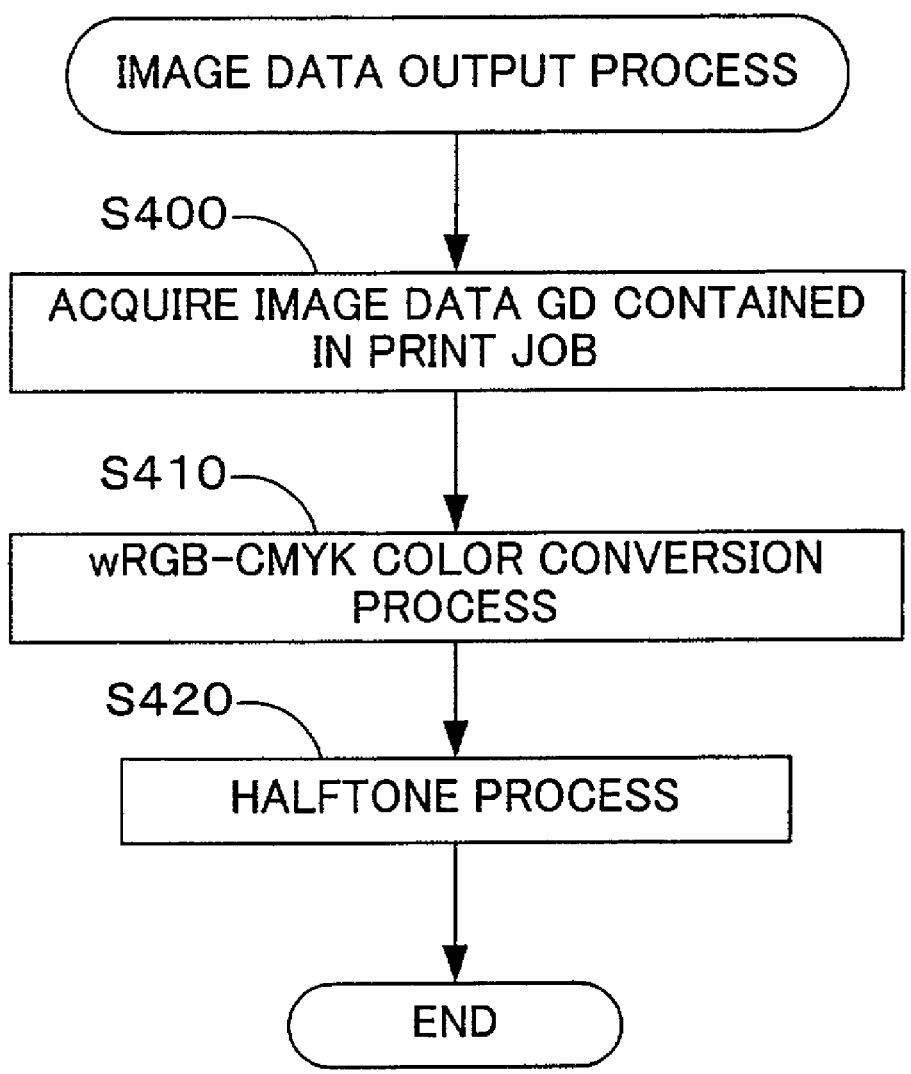
FIG. 12 is a flow chart showing a processing routine for image data output processing performed in a personal computer PC.

Image processing in a personal computer PC functioning as the image processing apparatus pertaining to this example is described with reference to FIG. 6-FIG. 12. FIG. 6 is a flow chart showing a processing routine for image processing performed in personal computer PC pertaining to this example. FIG. 7 is a flow chart showing a processing routine for image processing performed in personal computer PC, based on image processing control information GC. FIG. 8 is an illustrative diagram showing the relationship of image processing and tone number according to this example. FIG. 9 is an illustrative diagram showing conceptually the condition of reducing tone number by means of executing color space conversion. FIG. 10 is an illustrative diagram showing conceptually the condition of being able to preserve tone number even by means of executing color space conversion due to the working effect of this example. FIG. 11 is a flow chart showing a processing routine for image processing for normal image processing performed in personal computer PC. FIG. 12 is a flow chart showing a processing routine for image data output processing performed in personal computer PC.

An image file GF generated by digital still camera 12 is provided to personal computer PC via a cable, or, via a memory card MC. When by means of control by a user, an image data processing application (program) installed on HDD 152, namely a retouch application, or, a printer driver, is run, CPU 150 commences reading the image file GF.

Alternatively, by means of detecting insertion of a memory card MC in card slot 153, or, by connection of digital still camera 12 to I/O terminal 154 via a cable, CPU 150 may automatically run the image processing application and commence reading the image file GF.

CPU 150, for example, upon reading out the image file GF from memory card MC, temporarily stores the read out image file GF in RAM 151, and searches for an image processing control tag in the extra information storage area 112 of the image file GF (Step S100). If CPU 150 successfully searches/discovers an image processing control tag (Step S110: Yes) it acquires and analyzes the image processing control information GC written at the time the image data was generated (Step S120). CPU 150 executes image processing, described in detail hereinbelow, on the basis of the analyzed image processing control information GC (Step S130), and terminates the processing routine.

CPU 150, in the event that an image processing tag cannot be searched/discovered (Step S110: No), cannot execute image processing reflecting the image processing control information GC at the time of image data creation, and therefore executes ordinary image processing (Step S140), and terminates the processing routine.

Image processing based on image processing control information executed in personal computer PC is described in detail with reference to FIG. 7. CPU 150 of personal computer PC fetches the image data GD from the read out image file GF (Step S200). This fetched image data GD is not the original but a copy, and until image processing is completed, the various image processes are performed on the copied image data GD.

Digital still camera 12, as noted previously, stores image data as a file of JPEG format, and in a JPEG file image data is stored using the YCbCr color space to increase compression. Currently, a 32-bit CPU is typically used as the CPU in personal computers PC, so 8-bit data size is assigned to each of the components of the image data, for example, if YCbCr data, to the Y, Cb and Cr components, the Y, Cb and Cr components each being representable by 256 tone numbers (color numbers) 0-255. Color values of the Y, Cb and Cr components are represented as integral values, and where color values of components each assume different integral values, the Y, Cb and Cr components are represented by 256 tone numbers 0-255. That is, where tone number is large, the data size of the image data will inevitably be large.

The concept of image processing characteristic of this example is described with reference to FIG. 9 and FIG. 10. In this example, CPU 50, in order to preserve throughout image processing the tone number (color number) of the original image data GD, executes an effective digit place increasing process on an operation result obtained by a matrix operation S. As noted, where image data GD is represented by 256 tones (8-bit tone) for each YCbCr component, color values of the image data GD shown in FIG. 9 assume integral values of 0 to 3 effective digits (0-255). By the way, matrix S includes decimal points in matrix coefficients, so after conversion color values of image data GD will not always assume integral values. To handle such image data GD color values as image data, they must be converted to integral values. A commonly used method for conversion to integral values is rounding, e.g. by rounding digits below the decimal point while preserving the effective digit place number, and handling only integral values as effective digits.

By the way, when the rounding process to integral values is performed while preserving effective digit place number, as shown in FIG. 9, if tone number was, for example, 5 prior to conversion, after conversion tone number has been reduced to 3. That is, if the effective digit place number is increased, a plurality of different color values will assume the same color value, due to preserving the effective digit place number. The S matrix operation is the initial process in image processing in this example, and if in this step tone number is reduced, correct restoration will not be possible in subsequent processes, reducing the accuracy of image processing. Further, since reduction of tone number means reduction of reproductive color number, this also creates the problem of reproductive color number differing (being reduced) between the original image data and the image data after image processing.

Accordingly, in this example, a place increasing process that increases the place number of effective digits of the converted image data GD, obtained as a result of executing matrix S on image data GD, to a number greater than the place number of effective digits of the original image data is performed. That is, where a color value of the original image data GD is 1 place, the effective digit place number is 1, so the effective digit place number of the converted image data GD becomes 2 or greater; and where a color value of the original image data GD is 3 places, the effective digit place number is 3, so the effective digit place number of the converted image data GD becomes 4 or greater. The extent of increase in effective digit place number allowed for converted image data relative to the effective digit place number of the original image data is a matter for arbitrary decision; in this example, tone number of image data for YCbCr and RGB components is increased from 8-bit tone to 18-bit tone. At this time the size of image data GD increases from 8 bits to 18 bits.

As a result, tone number becomes 1024x, and as shown in FIG. 10 color value graduation in the converted RGB color space is finer than in FIG. 9, and where color values have values of up to 3 places below the decimal point, all color values can be converted to integral values in the converted image data. If color values having tone number of up to 3 places below the decimal point are converted to integral values, it is possible to prevent reduction of tone number, and the tone number of the original image data can be preserved throughout subsequent image processing. Even if a plurality of color values of converted image data assume identical values, sine since the tone number is 1024x, it is possible to easily preserve a tone number of 256 for the components of the original image data GD, and reducing in reproductive color number can be prevented.

CPU 150 executes a 3×3 matrix operation S to convert image data based on the YCrCb color space to image data based on the RGB color space (Step S210). CPU 150 increases the tone number of the matrix-converted image data GD from 8 -bit tone to 18-bit tone, as shown in FIG. 8, preventing a decline in tone number occurring with matrix operation S. Matrix operation S is the operation equation indicated below.

$$\begin{pmatrix} Rs \\ Gs \\ Bs \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

As a result of matrix S conversion, image data (color value) may assume negative values or positive values of 256 or greater (in the case of 8-bit tone); in this example, CPU 150 preserves these negative values, or, positive values of 256 or greater, and subsequent image processing continues.

CPU 150 performs gamma correction on image data based on the RGB color space obtained in this way (Step S220). During gamma correction, CPU 150 acquires a DSC-side gamma value from the image processing control information GC, with the acquired gamma value creates in RAM 151 an 18-bit gamma correction table using the gamma correction operation equation indicated below, and performs gamma correction on the image data GD using the created gamma correction table. That is, gamma value is also included among the image processing control parameters stipulated by image processing control information GC. The operation equation for gamma correction is as follows.

$$Rs, Gs, Bs \geq 0$$
$$Rs' = \left(\frac{Rs}{255}\right)^\gamma \quad Gs' = \left(\frac{Gs}{255}\right)^\gamma \quad Bs' = \left(\frac{Bs}{255}\right)^\gamma$$
$$Rs, Gs, Bs < 0$$
$$Rs' = -\left(\frac{-Rs}{255}\right)^\gamma \quad Gs' = -\left(\frac{-Gs}{255}\right)^\gamma \quad Bs' = -\left(\frac{-Bs}{255}\right)^\gamma$$

CPU 150 executes on the gamma-corrected image data GD a matrix operation $(N^{-1}M)$ that associates the original color space and the wRGB color space (Step S230). For tone number of converted image data GD obtained by executing matrix operation $(N^{-1}M)$ as well, in a manner similar to the case of matrix operation S, as shown in FIG. 8, CPU 150 increases [the converted data] from 18-bit tone to 32-bit tone by means of a place increasing operation, to prevent reduction in tone number. The image file GF used in this example in the matrix operation can include color space information at the time of image creation, so where color space information is included in the image file GF, CPU 150, when executing matrix operation $(N^{-1}M)$, refers to the color space information and executes the matrix operation using a matrix $(N^{-1}M)$ that corresponds to color space at the time of image creation.

Matrix operation $(N^{-1}M)$ is a composite matrix of matrix operation M, which uses matrix M to convert the RGB color space to the XYZ color space, and the inverse matrix operation $N^{-1}$ of the matrix operation N, which uses matrix N to convert the wRGB color space to the XYZ color space. Matrix M is a matrix for preserving image data (negative color values) not included in the reproductive color range of the sRGB color space but valid as data, and converting image data based on the RGB color space to image data based on the XYZ color space. The matrix values of matrix M are determined in accordance with the color space information. In inverse matrix N of matrix N is a matrix for converting image data converted by matrix operation M into image data based on an XYZ color space into the wRGB color space having a wider definition range than the sRGB color space (restore to RGB color space). The XYZ color space is one of the machine-independent color spaces that are not dependent on machine output characteristics, and is used to perform association of color values in the RGB color space and the wRGB color space. Matrix operation $(N^{-1}M)$ is the operation equation indicated below.

$$\begin{pmatrix} Rw \\ Gw \\ Bw \end{pmatrix} = N^{-1}M \begin{pmatrix} Rs' \\ Gs' \\ Bs' \end{pmatrix}$$

$$N^{-1}M = \begin{pmatrix} 0.7152 & 0.2848 & 0.0001 \\ 0.0000 & 1.0001 & 0.0000 \\ 0.0000 & 0.0412 & 0.9588 \end{pmatrix}$$

The color space of the image data GD obtained after executing matrix operation $(N^{-1}M)$ is the wRGB color space, which has a wider definition range than the sRGB color space. Conventionally, the color space used during image processing in printers or computers was fixed to RGB, so, for example, even if the printer had a reproductive color range wider than that sRGB color space and including the reproductive color range of digital still camera 12, the color space of the digital still camera 12 could not be utilized effectively. In contrast to this, in this example, in the event that color space information is included in an image file GF, a matrix $(N^{-1}M)$ used for matrix operation M is modified in correspondence with the color space information, so the color space of digital still camera 12 can be utilized effectively, to achieve correct color reproduction.

CPU 150 performs inverse gamma correction on the image data obtained by matrix operation $(N^{-1}M)$ (Step S240). As shown in FIG. 8, CPU 150 reduces the tone number of the image data GD obtained by matrix operation $(N^{-1}M)$ from 32-bit tone to 18-bit tone, and also reduces data size from 32 bits to 18 bits. Reduction in tone number is performed by extracting the upper 18 bits of the 32-bit image data GD as image data GD. When executing gamma correction, CPU 150 acquires a printer-side default gamma value from HDD 152, creates in RAM 151 an inverse gamma correction table using the inverse of the gamma value obtained with the inverse gamma correction operation equation indicated below, and performs inverse gamma correction on the image data GD using the created inverse gamma correction table. The operation equation used for inverse gamma correction is as follows.

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

As shown in FIG. 8, CPU 150 reduces the tone number of the inverse gamma-corrected image data GD from 18-bit tone to 8-bit tone, and also reduces data size from 18 bits to 8 bits. During the inverse gamma correction process it is necessary to create an inverse gamma correction table, and if tone number is large, the amount of memory resources needed will increase, and extended processing time will be required. On the other hand the tone number recognizable by the human eye is about 8-bit tone, so there is no effect on output results. Reduction in tone number is performed by extracting the upper 8 bits of the 18-bit image data GD as image data GD. In automatic adjustment processing of image quality, performed next, in some instances the R, G and B components are processed simultaneously, because for individual components only 8-bit image data can be handled.

CPU 150 executes automatic adjustment processing of image quality on the inverse gamma-corrected image data GD (Step S250). In automatic adjustment processing in this example, image data GD contained in the image file GF is analyzed to acquire characteristic parameters indicating image quality, and automatic adjustment of image quality to correct the image data to reflect image processing control information GC contained in the image file GF and the acquired characteristic parameters is executed. In image quality automatic adjustment processing, standard parameters marked for correction are determined in advance, and an amount of quality correction such that discrepancy between the standard parameters and characteristic parameters of the image data is eliminated or reduced is determined. The image processing control information GC can be used to modify standard parameter values, or used for modification of the appropriate level of quality correction.

Correction of image data for, for example, brightness, contrast, color balance and the like is typically termed tone curve, performed on individual picture element (pixel) units using a characteristic curve that associates RGB signal input level and output level. For example, for saturation, sharpness, noise reduction and the like, pixel operation processing (filter processing), not tone curve processing, is performed on pixel units.

CPU 150, once completing picture quality automatic processing, outputs the processed image data to the printer driver (Step S260) and returns to the processing routine shown in FIG. 6.

Next, ordinary image processing executed in personal computer PC is described with reference to FIG. 11. Of the processes executed in each step, processes similar to processes in expansion image processing described with reference to FIG. 7 will be described only briefly. The CPU 150 of personal computer PC fetches image data GD from the read out image file GF (Step S300). CPU 150 executes a 3×3 matrix operation S to convert image data based on the YCrCb color space to image data based on the sRGB color space (Step S310). Matrix operation S is the operation equation described previously.

CPU 31 executes automatic adjustment processing of image quality on the image data obtained by executing matrix operation S (Step S320), outputs the image-processed image data GD to the printer driver (Step S330) and returns to the processing routine shown in FIG. 7.

Referring now to FIG. 12, output process of image data GD, namely, print control processing performed by the printer driver (print control program) is described. CPU 150 acquires the image data contained in the print job (Step S400), and executes an RGB-CMYK color conversion process for printing (Step S410). In the event that, prior to the color conversion process, the resolution of the image data GD is lower than the print resolution, linear interpolation is performed to create new data between adjacent image data, and conversely where higher than print resolution, data is thinned out at a given proportion, to perform resolution conversion processing to convert the resolution of the image data to the print resolution.

Where the results of image processing on copied image data GD up to this point are to be reflected in the original image data GD, this is done by selecting overwrite of the image data. Where it has been possible to acquire from an image file GF the color space set at the time the image data was created, and the set color space is a color space wider than the sRGB color space, for example, a wRGB-CMYK color conversion table is used; and where an image processing control has not been found, an sRGB-CMYK color conversion table is used. CPU 150 refers to a conversion lookup table (LUT) stored in HDD 152 and associating the wRGB color space with the CMYK color space, and converts the color space of the image data from the wRGB color space to the CMYK color space. That is, image data consisting of R/G/B tone values is converted, for example, to data of tone values of the 6 colors C/M/Y/K/LC/LM, for use by color printer 20.

CPU 150 executes halftone processing (Step S420) and terminates the routine. In halftone processing, the color-converted image data is received, and a tone number conversion process is performed. In this example, after color conversion the image data is represented as data having 256-tone width for each color. In contrast, with the color printer 20 of this example, only a state of either "form dot" or "do not form dot" can be assumed, so the color printer 20 of this example can only represent two tones locally. Accordingly, image data having 256 tones is converted to image data represented by two tones representable by the color printer 20. As a representative method for this two-toning (binarization) process, there is a method called the error diffusion method and a method called the systematic dithering method. CPU 150 also performs an interlacing process on the image data converted a specific expression format based on the dot on-off state, to line it up in the proper order for transmission to the color printer 20.

According to the personal computer PC in the example described hereinabove, image data tone number and reproductive color number can be preserved from before to after image processing conversion of the image data GD. As explained with reference to FIG. 9, typically, when the color space of image data GD is converted, the distribution of color values of the converted image data GD assumes unequal intervals, and when forced to conform to the tone intervals of the color space prior to conversion (i.e. converted to integral values), a plurality of color values that were different in the color space prior to conversion may now assume identical color values in the converted color space, so that tone number is always reduced. In contrast to this, with the personal computer PC pertaining to this example, at the time of executing matrix operation S, which is the initial image process on image data GD, the tone number (image data size) is increased from 8 bits to 18 bits (effective digit place number is increased) so that color values that are different in the color space prior to conversion do not readily assume identical color values in the converted color space. Further, since tone number is increased from 256 to 262144, even if some color values should assume identical values, overall, 256 tones can be preserved. Accordingly, the 256 tones which are the tone number of the original image data GD can be preserved, and a reproductive color number of 16,770,000 colors can be preserved.

Figure 13:
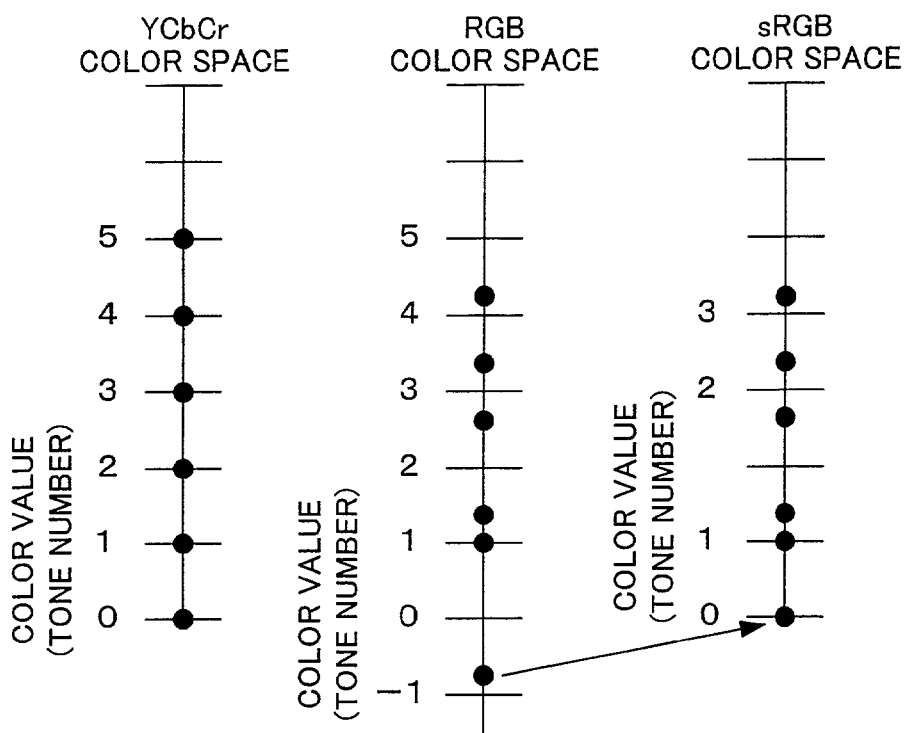
FIG. 13 is an illustrative diagram showing conceptually the condition of reducing tone number by dropout negative color values occurring during execution of color space conversion.
Figure 14:
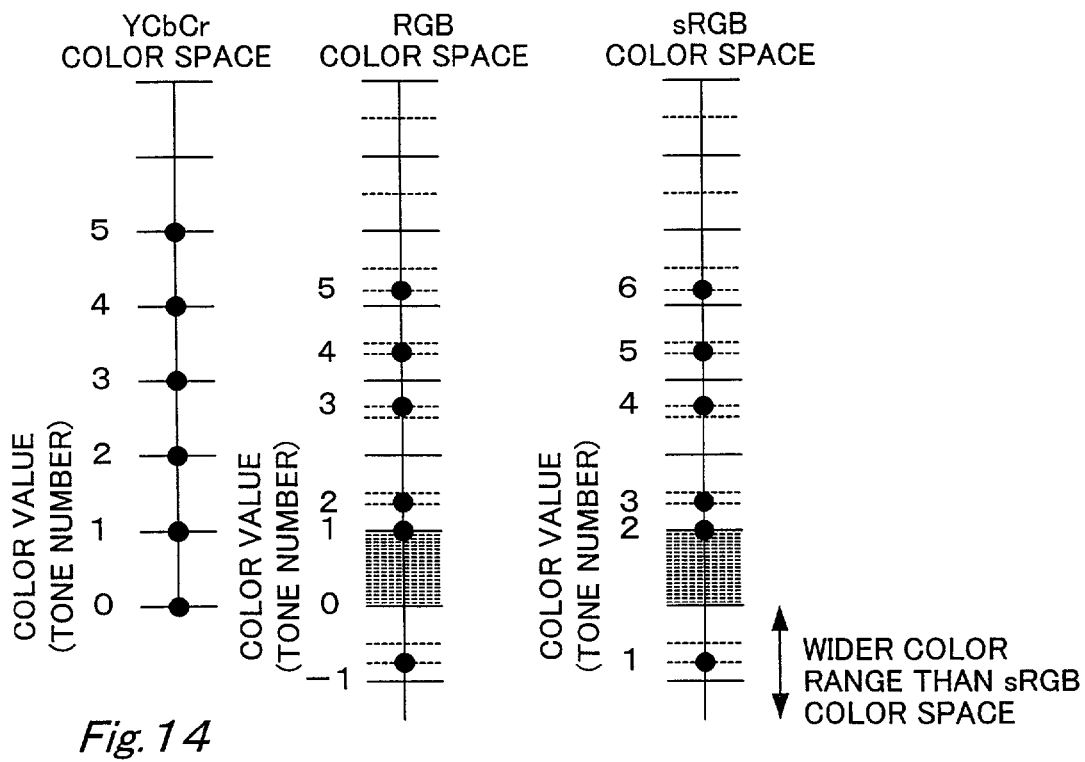
FIG. 14 is an illustrative diagram showing conceptually the condition of being able to preserve tone numbers obtained by means of negative color values, even by means of executing color space conversion due to the working effect of this embodiment.

Further, in this example, negative color values included in image data color-converted by means of matrix operation S from the YCbCr color space (color system) to the RGB color space (color system) are preserved, and the converted image data is mapped to the wRGB color space including in its color range the occurring negative color values. Accordingly, dropout of colors (tones) represented by negative color values is prevented, preventing any decline in reproductive color number before and after conversion. This condition is described with reference to FIG. 13 and FIG. 14. FIG. 13 is an illustrative diagram showing conceptually the condition of reducing tone number by dropout of negative color values occurring due to execution of color space conversion. FIG. 14 is an illustrative diagram showing conceptually the condition of being able to preserve tone numbers obtained by means of negative color values, even by means of executing color space conversion due to the working effect of this example.

RGB data obtained by matrix operation S may include negative color values. As shown in FIG. 13, conventionally, converted image data obtained using matrix S is mapped to the standard sRGB color space. In mapping to the sRGB color space, for color values outside the color range of the sRGB color space, that is negative color values and color values of 256 and above (in the case of 8-bit data), there is performed a process of clipping to color values of 0 and 255, for example. In this case, even if tone number is increased, negative color values [and] color values of 256 and above disappear, so tones and color numbers represented by the negative color values and color values of 256 could not be preserved. Accordingly, the tone number (reproductive color number) of 6 of the YCbCr color space is reduced to 3 in the RGB color space in the process of the matrix operation and clipping of negative color values.

In contrast to this, in this example, image data converted using matrix X is mapped to the wRGB color space, which has a wider color range than the sRGB color space. Accordingly, as shown in FIG. 14, color values that are negative in the RGB color space assume positive color values in the wRGB color space due to its wider color range than the sRGB color space. Further, by increasing tone number, tone dropout occurring with color range expansion and matrix operations can be prevented. As a result, the tone number (reproductive color number) of 6 of the YCbCr color space is preserved in the wRGB color space, and tone dropout and reduction in reproductive color number predicted to occur when matrix operation S is executed can be effectively prevented.

F. Other Embodiments

In the preceding example, image processing of image data GD for output to color printer 20 and monitor 14 is performed in a personal computer PC, but all image processing could instead be performed by the color printer 20. In this case, image processing of image data GD, display of image processed image data, and printing of image processed image data GD could all be realized by means of color printer 20. Where image processing is performed by color printer 20, the memory resources that can be utilized for image processing are limited, so the increase/decrease in tone number may be modified. For example, for each component, matrix operation S could be performed on 8-bit image data GD to give 18-bit tone, gamma correction processing could be performed using the upper 11 bits to give 18-bit tone, matrix operation ($N^{-1}M$) could be performed to give 28-bit tone, inverse gamma correction processing could be performed using the upper 12 bits to give 8-bit tone, and automatic image quality adjustment processing performed. In this case, there is no restoration to the tone number of the original image data in the course of image processing, so as for tone number the 8-bit tone of the original image data remains preserved in the image-processed image data.

Also, all or a portion of the image processing could be performed on a server over a network.

Although the image processing apparatus, image processing method, image processing program and image output apparatus pertaining to the present invention have been described based on an example, the embodiment of the invention described above merely serves to facilitate understanding of the invention, and is not limiting of the invention. It is obvious that equivalent alterations and modifications to the invention are possible without departing from the spirit and scope of the claims, and these equivalents are included in the present invention.

The tone number used in the preceding example is merely exemplary, and 32-bit tone may be maintained from the matrix S operation up to inverse gamma correction. Where the number of data bits utilizable in a personal computer PC or the like goes from 32 bits to 64 bits, 64-bit tone may be used instead of 32-bit tone. In this case, tone dropout during image processing may be even more effectively prevented. In any case, the 8-bit tone of the original image data GD may be preserved until image processing is completed.

In the preceding example, tone number is reduced once matrix operation ($N^{-1}M$) is performed, but tone number could instead be reduced after inverse gamma correction, or after automatic image quality adjustment processing. Tone number herein is merely exemplary, it being possible to employ any tone number provided that tone number is preserved from before to after image processing.

While the preceding example describes a digital still camera 12 as the image file generating apparatus, a scanner, digital video camera or the like may could used as well. While the preceding embodiment describes an Exif format file as a specific exemplary image file GF, the image file format pertaining to the invention is not limited thereto. It is possible to use any image file that includes image data generated by a image data generating apparatus, and image processing control information GC describing conditions at generation (information) of the image data. The use of such files enables the quality of image data generated by a image data generating apparatus to be adjusted automatically as appropriate for output by an output apparatus.

In the preceding example there was described as an example the case of image data GD and image processing control information GC being included in the same image file GF, but it is not always necessary for image data GD and image processing control information GC to be stored in the same file. That is, it is sufficient for image data GD and image processing control information GC to be associated, for example, by creating association data associating image data GD and image processing control information GC, and storing one or a plurality of image data and image processing control information GC in independent files, referring to the associated image processing control information GC when processing the image data GD. In this case, although image data and image processing control information GC are stored in separated files, at the point in time of image processing using image processing control information GC, the image data and image processing control information GC are indivisibly related, so functionality is substantially the same as with storage in a single file. That is, a mode in which associated image data and image processing control information GC are used, at least in the point in time of image processing, is included in the image file GF in this example. Motion video files stored on optical media such as CD-ROM, CD-R, DVD-ROM DVD-RAM and the like are also included.

What is claimed is:

1. An image processing apparatus for performing image processing of image data, said image processing apparatus comprising:

a color converter for converting by use of a matrix operation image data of a first color system in a first color coordinate system, said first color system capable of representing a first color number, to image data of a second color system in a second color coordinate system, said second color system capable of representing a second color number more numerous than the first color number, while preserving the first color number;

an image processor for performing image processing on the converted image data in the second color system; and a reproductive color number reducer for reducing the reproductive color number of image data subjected to the image processing.

2. An image processing apparatus according to claim 1 wherein image processing performed by the image processor includes gamma correction processing.

3. An image processing apparatus according to claim 2 wherein the first color system is the YCC color system, and the second color system is the sRGB color system.

4. An image processing apparatus according to claim 1 wherein the second color number of the second color system includes a color number represented by a negative value included in image data converted by the color from the first color system to the second color system.

5. An image processing apparatus according to claim 4 wherein image processing performed by the image processor includes gamma correction processing.

6. An image processing apparatus according to claim 4 or 5 wherein image processing performed by the image processor includes color conversion processing using a second matrix operation.

7. An image processing apparatus according to claim 4 wherein the first color system is the YCC color system, and the second color system is the wRGB color system having a wider color representation range than the sRGB color system.

8. An image processing apparatus for performing image processing on image data, said image processing apparatus comprising:

a first image processor for modifying a color value of the image data represented by an integral value having first effective digits into a first value having a greater place number than the place number of the first effective digits;

a tone number reduction preventer for preventing reduction of tone number of the image data accompanying modification of color value by the first image processor; and a second image processor for modifying the color values of image data having the first value from the first value to a second value reflected in image output results.

9. An image processing apparatus according to claim 8 wherein the tone number reduction preventer prevents reduction of tone number of the image data by setting the effective digits of the first value to a greater place number than the place number of the first effective digits.

10. An image processing apparatus according to claim 9 wherein the data size of image data prevented by the tone number reduction preventer from tone number reduction is larger than the data size of image data represented by integers having the first effective digits.

11. An image processing apparatus according to any of claims 8 to 10 wherein the first image processor is color space convener for convening the color space of the image data from a first color space to a second color space.

12. An image processing apparatus according to claim 11 wherein the color space converter converts the color space of the image data from the YCbCr color space to the RGB color space, and modifies a color value of the image data represented by integers having the first effective digits to the first value that includes a decimal point.

13. An image processing apparatus for performing image processing on image data, said image processing apparatus comprising:

a first color space converter for increasing the tone number of the image data from a first tone number to a second tone number, as well as converting the color space of image data from the YCbCr color space to the sRGB color space;

a gamma corrector for performing gamma correction on the color space-converted image data;

a second color space converter for converting the color space of gamma-corrected image data from the RGB color space to a wRGB color space having a wider defined range than the sRGB color space; and a tone number reducer for restoring tone number of the color space-converted image data from the second tone number to the first tone number.

14. An image processing apparatus according to claim 13 further comprising:

an inverse gamma corrector for performing inverse gamma correction on the color space-converted image data;

wherein the tone number reducer restores the tone number of the inverse gamma-corrected image data, rather than the color space-converted image data, from the second tone number to the first tone number.

15. An image processing apparatus according to claim 14 further comprising:

an image corrector for automatically correcting quality of the inverse gamma corrected-image data;

wherein the tone number reducer restores the tone number of the quality-corrected image data, rather than the inverse gamma-corrected image data, from the second tone number to the first tone number.

16. A printing apparatus for outputting image-processed image data, said printing apparatus comprising:

the image processing apparatus according to claim 1 or any of claims 8, 9, 10, or 12, and an output for outputting image data subjected to image processing by the image processing apparatus.

17. A computer-readable medium having recorded thereon an image processing program for performing image processing on image data, wherein the image processing program realizes by means of a computer:

a function for converting by means of a matrix operation image data of a first color system in a first color coordinate system, said first color system capable of representing a first color number, to image data of a second color system in a second color coordinate system, said second color system capable of representing a second color number more numerous than the first color number, while preserving the first color number;

a function for performing image processing on the converted image data in the second color system; and a function for reducing the reproductive color number of image data subjected to the image processing.

18. A computer-readable medium according to claim 17 wherein the second color number of the second color system includes a color number represented by a negative value included in image data converted from the first color system to the second color system by the color converting function.

19. A computer-readable medium according to claim 18 wherein the function for performing image processing is a function for executing at least one process selected from gamma correction and color conversion using a second matrix operation.

20. A computer-readable medium according to claim 18 wherein the first color system is the YCC color system, and the second color system is the wRGB color system having a wider color representation range than the sRGB color system.

21. A computer-readable medium having recorded thereon an image processing program for performing image processing on image data, wherein the image processing program realizes by means of a computer:
- a first image processing function for converting a color value of the image data represented by an integral value having first effective digits into a first value having a greater place number than the place number of the first effective digits;
- a function for preventing reduction of tone number of the image data accompanying modification of color value by the first image processing function; and
- a second image processing function for modifying a color value of image data having the first value from the first value to a second value that is reflected in image output results.

22. A computer-readable medium according to claim 21 wherein the preventing of reduction of tone number is realized by setting the effective digits of the first value to a greater place number than the place number of the first effective digits.

23. A computer-readable medium according to claim 22 wherein the data size of image data prevented by the tone number reduction preventing means from tone number reduction is larger than the data size of image data represented by integers having the first effective digits.

24. A computer-readable medium according to claim 22 or 23 wherein the first image processing function is color space converting function for converting the color space of the image data from a first color space to a second color space.

25. A computer-readable medium according to claim 24 wherein the color space converting function converts the color space of the image data from the YCbCr color space to the RGB color space, and modifies a color value of the image data represented by integers having the first effective digits to the first value that includes a decimal point.

26. A computer-readable medium having recorded thereon an image processing program for performing image processing on image data, wherein the image processing program realizes by means of a computer:
- a first color space converting function for increasing the tone number of the image data from a first tone number to a second tone number, as well as converting the color space of image data from the YCbCr color space to the sRGB color space;
- a gamma correcting function for performing gamma correction on the color space-converted image data,;
- a second color space converting function for converting the color space of gamma-corrected image data from the sRGB color space to a wRGB color space having a wider defined range than the sRGB color space; and
- a tone number reducing function for restoring the tone number of the color space-converted image data from the second tone number to the first tone number.

27. A computer-readable medium according to claim 26 wherein the image processing program further realizes by means of a computer:
- an inverse gamma correcting function for performing inverse gamma correction on the color space-converted image data;
- wherein the tone number reducing function is a function for restoring the tone number of the inverse gamma-corrected image data, rather than the color space-converted image data, from the second tone number to the first tone number.

28. A computer-readable medium according to claim 27 wherein the image processing program further realizes by means of a computer:
- an image correcting function for automatically correcting quality of the inverse gamma corrected-image data;
- wherein the tone number reducing function restores the tone number of the quality-corrected image data, rather than the inverse gamma-corrected image data, from the second tone number to the first tone number.

* * * * *